United States Patent [19]
Christensen

[11] 4,076,508
[45] Feb. 28, 1978

[54] DEBRIS SEPARATOR FOR HOT GAS STREAM

[76] Inventor: Frederich M. Christensen, 10256 Prarie Road, Omaha, Nebr. 68134

[21] Appl. No.: 801,779

[22] Filed: May 31, 1977

[51] Int. Cl.² .......................................... B01D 50/00
[52] U.S. Cl. ................................. 55/309; 55/325; 55/332; 55/432; 55/434; 55/449; 55/451; 55/452; 55/454; 55/457; 55/463; 55/DIG. 30; 60/311
[58] Field of Search ............... 55/307, 309, 325, 332, 55/336, 337, 385 B, 385 R, 447–452, 454, 456, 457, 463, 434, 432, DIG. 30; 60/311; 210/304

[56] References Cited
U.S. PATENT DOCUMENTS

| | | | |
|---|---|---|---|
| 1,742,769 | 1/1930 | Kamrath | 55/451 X |
| 2,158,863 | 5/1939 | Randall | 55/463 |
| 2,802,618 | 8/1957 | Prachar | 55/457 X |
| 3,148,043 | 9/1964 | Richardson et al. | 55/306 |
| 3,286,459 | 11/1966 | Ephraim, Jr. | 55/385 R X |
| 3,302,395 | 2/1967 | Robbins | 60/39.09 |
| 3,309,867 | 3/1967 | Ehrich | 60/39.09 |
| 3,352,104 | 11/1967 | Duerr | 60/13 |
| 3,362,155 | 1/1968 | Driscoll | 60/39.09 |
| 3,444,672 | 5/1969 | Alsobrooks | 55/336 X |
| 3,616,616 | 11/1971 | Flatt | 55/306 |
| 3,618,303 | 11/1971 | Nagel | 55/337 |
| 3,735,587 | 5/1973 | Addie et al. | 55/385 R X |
| 3,751,907 | 8/1973 | Anderson | 60/39.09 P |
| 3,832,086 | 8/1974 | Hull, Jr. et al. | 55/306 X |
| 3,971,218 | 7/1976 | Toth, Jr. et al. | 60/597 |
| 3,979,903 | 9/1976 | Hull, Jr. et al. | 55/306 X |
| 3,993,463 | 11/1976 | Barr | 55/306 |

FOREIGN PATENT DOCUMENTS

| | | | |
|---|---|---|---|
| 120,165 | 11/1947 | Sweden | 55/434 |
| 793,989 | 4/1958 | United Kingdom | 55/457 |

*Primary Examiner*—Frank W. Lutter
*Assistant Examiner*—Kathleen J. Prunner

[57] ABSTRACT

The disclosure concerns a separator for removing broken engine parts and other debris from the hot gases passing fro the exhaust manifold of an engine to the inlet of an associated turbocharger. The separator includes an annular separation chamber in which the gases are swirled by stationary vanes to effect centrifugal separation of the debris, and a cylindrical screen which filters the gases as they leave the separation chamber. The screen is mounted in cantilever fashion within the separator casing and carries, at its free end, the vanes and a deflector which directs inlet flow radially outward to the separation chamber. The vanes are freely mounted in slots formed in the screen, where they are held captive by the slot margins and the deflector, and the tips of the vanes are spaced radially from the surrounding casing of the separator. The marginal edges of the screen perforations should be rounded for flow-smoothing purposes, and turbulence within the screen may be reduced by inclusion of a bleed passage which leads through the deflector. Preferably, the flow path through the separator has a decreasing cross section in the direction of flow, so that an increase in velocity is effected.

11 Claims, 14 Drawing Figures

DEBRIS SEPARATOR FOR HOT GAS STREAM

BACKGROUND AND SUMMARY OF THE INVENTION

Diesel engines used on railroad locomotives commonly are equipped with turbochargers which are driven by the hot engine exhaust gases and serve to compress intake air. Since these exhaust gases may contain debris, such as pieces of broken engine valves, which can damage the turbine section of the turbocharger, prudence dictates inclusion of a debris separator in the piping between the engine exhaust manifold and the turbine inlet. Usually, the separator is an in-line unit containing a screen in the form of a flat perforated disc which extends across the flow path of the hot gases This type of separator has not proven entirely satisfactory, primarily because any foreign material entrained in the exhaust gas impacts directly upon the screen. In some instances, large metal pieces have broken through the screen and passed into and destroyed the turbine. Moreover, since the perforations of the screen must be relatively large (e.g., diameters of 3/16 – ¼ inch) in order to keep to an acceptable level the backpressure imposed on the engine, these separators cannot remove small metal pieces and carbon particles, both of which may be detrimental to the turbine.

The object of this invention is to provide an improved separator for removing debris from the inlet flow to a hot gas turbine which is more effective and reliable than the screen type unit presently employed, yet entails a comparable expenditure and may be installed just as easily. According to the invention, debris removal is accomplished by the sequential use of centrifuging and screening operations. The separator comprises a casing containing an annular chamber in which the gases are swirled by stationary vanes to cause centrifugal separation of entrained material, a duct for extracting such material from an outer peripheral region of the chamber, and a screen of cylindrical form which defines the inner peripheral boundary of the annular chamber and is traversed by the gases after thay have passed through that chamber. The gas stream approaches the separator in the axial direction and is deflected radially outward to the annular chamber by a deflector which covers one end of the cylindrical screen. With this arrangement, much of the entrained debris is either deflected directly into the collection duct or is forced into the duct as a result of the swirling motion of the gases, and thus is removed without ever contacting the screen. The remaining debris, particularly the larger metal pieces, may be captured and withdrawn by the collection duct only after ricochetting within the annular chamber However, since none of the debris impinges directly upon the screen, and most of the kinetic energy of the ricochetting pieces is spent during deflections prior to any contact with the screen, the risk of impact damage to the screen is minimized. Furthermore, as a result of inclusion of the centrifugal separation step, the separator can remove small metal pieces and carbon particles, even though the perforations in its screen are sized to keep to an acceptable level the backpressure imposed on the engine.

Separators used in applications of the type under consideration here encounter fluctuating temperatures which may be as high as 900° F to 1100° F, so thermally induced stresses resulting from differential expansion and contraction of the parts can be a problem. Moreover, the unit is subjected to pulsating gas flow and considerable mechanical vibration. The preferred construction provided by the invention takes adequate account of these conditions. In the first place, the cylindrical screen used here is mounted within the casing in cantilever fashion. In addition, the turning vanes which swirl the gases are mounted freely in slots formed in the free end of the screen and are sized so that their outer tips are spaced radially inward from the surrounding region of the casing. These measures provide the flexibility needed to preclude build-up of crack-producing internal stresses, and thereby make the separator reliable under service conditions.

The casing of the preferred separator is provided with external flanges at its opposite ends and is adapted to be bolted in place between the engine exhaust and manifold and the turbine inlet piping in the same way as the screen separators now in service. The separator also includes several features which tend to minimize turbulence in the gas stream delivered to that inlet piping. One of these is the provision of a bleed passage which extends through the deflector and conveys into the interior of the cylindrical screen a very small portion of the hot gases entering the separator. This bleed stream precludes creation of a negative pressure area inside the screen, and thus tends to smooth the flow. Further flow-smoothing is effected by rounding the marginal edges of the perforations in the screen. Finally, the preferred separator provides a flow path of gradually decreasing cross section, so that the velocity of the gases increases as they pass from the exhaust manifold to the turbine inlet piping. Since the minimum flow area of the separator is at its outlet and is the same as the flow area of the existing turbine inlet piping, incorporation of the improved separator has no appreciable effect on the backpressure imposed on the engine.

BRIEF DESCRIPTION OF THE DRAWINGS

The preferred embodiment of the invention is described herein with reference to the accompanying drawings, in which.

DESCRIPTION OF ILLUSTRATED EMBODIMENT

Figure 1:
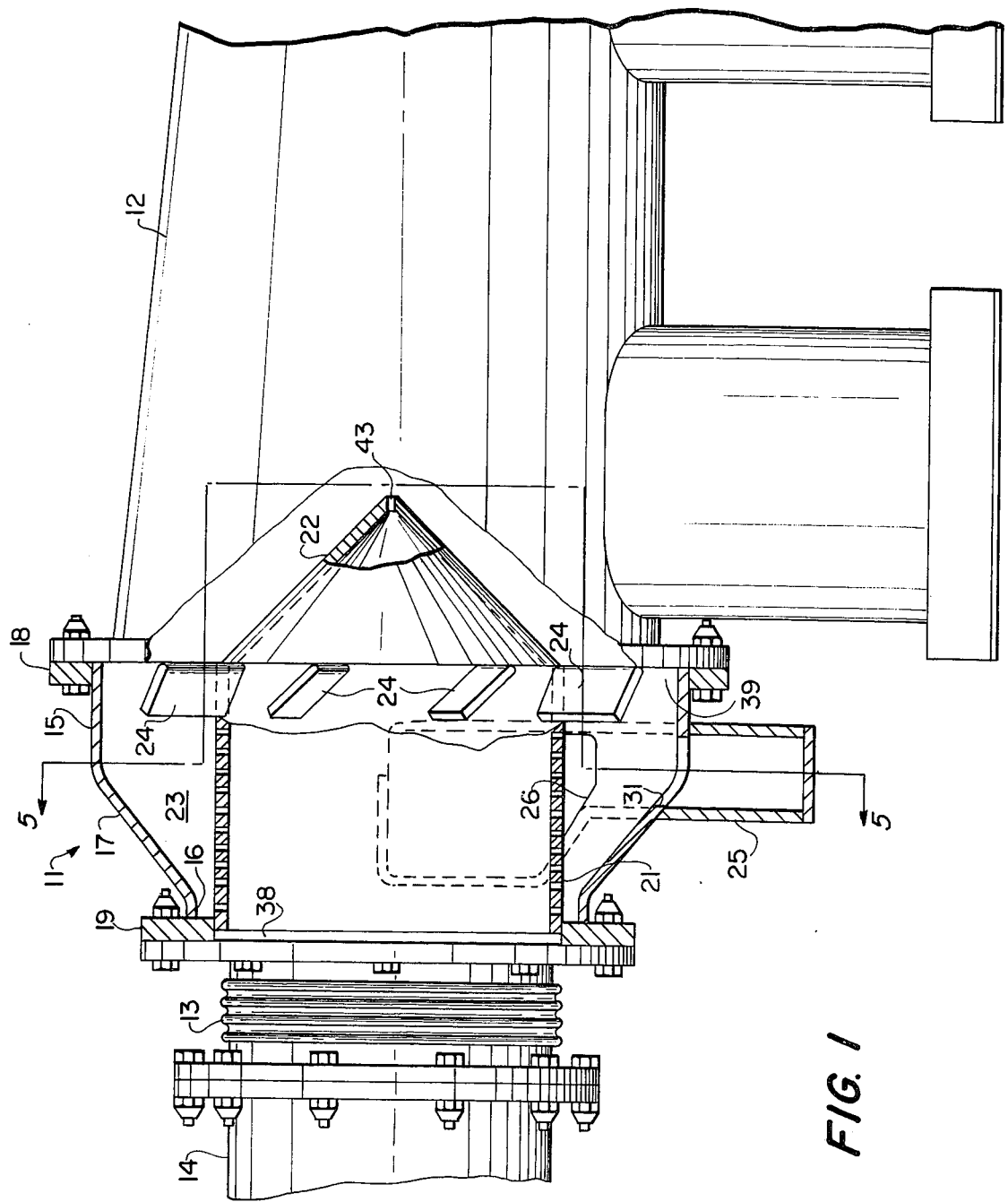
FIG. 1 is an axial sectional view of the improved separator, showing that device in a typical installation.
Figure 2:
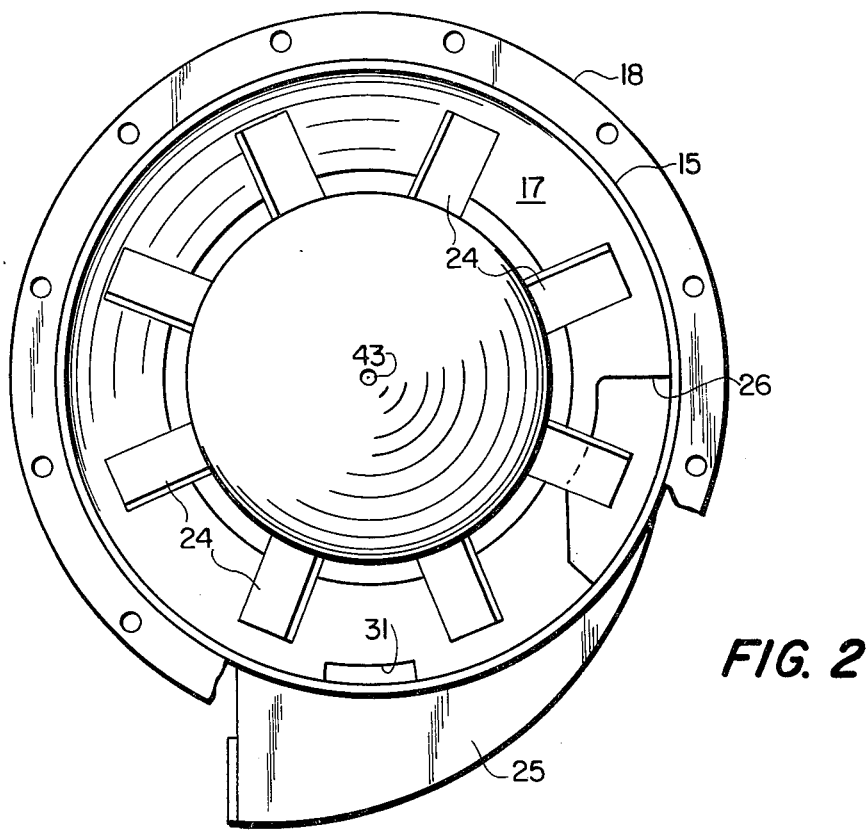
FIGS. 2 and 3 are views, on slightly reduced scale, of the inlet and outlet ends, respectively, of the separator.
Figure 3:
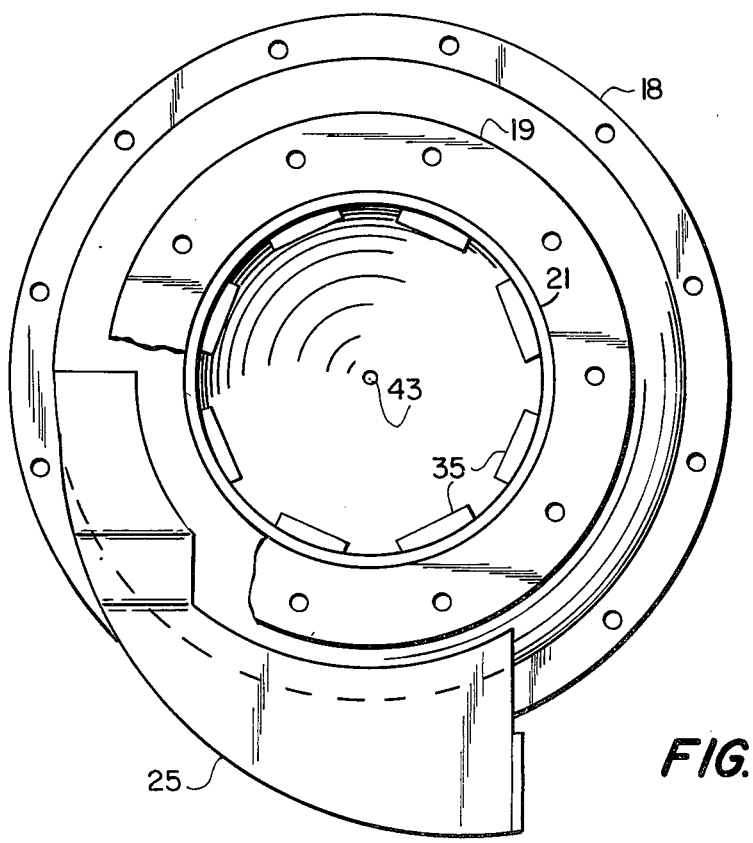
Figure 4:
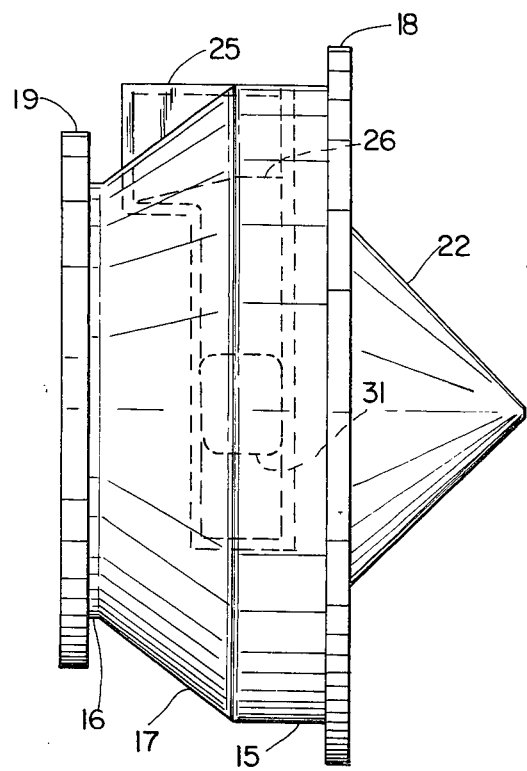
FIG. 4 is a plan view of the separator, also on slightly reduced scale.
Figure 5:
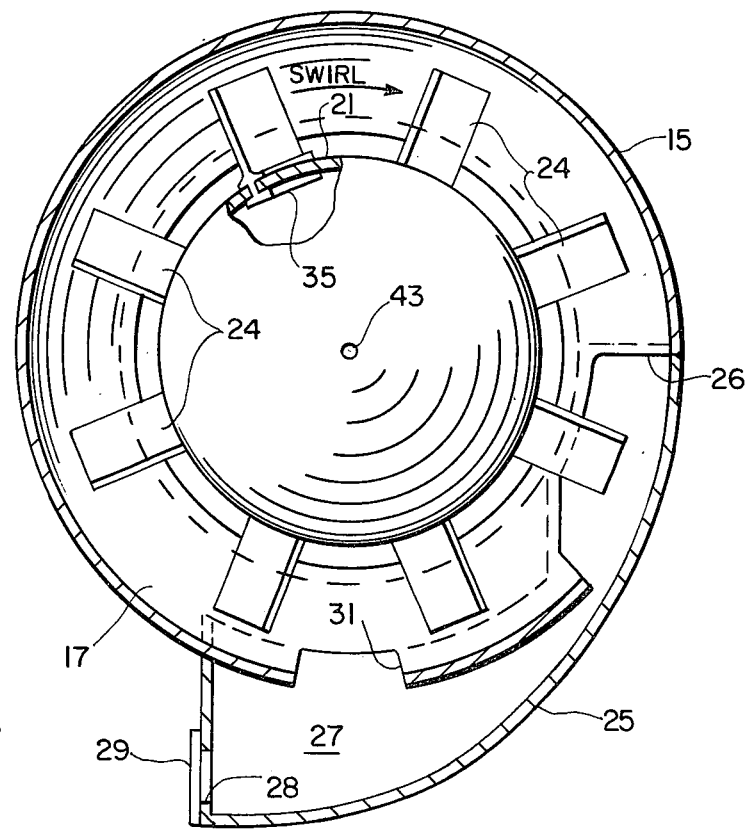
FIG. 5 is a sectional view taken on line 5—5 of FIG. 1.
Figure 6:
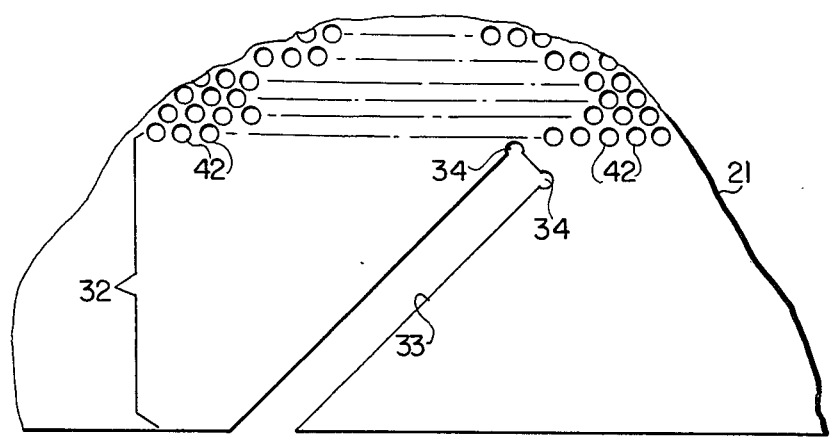
FIG. 6 is a development of a portion of the cylindrical screen showing one type of vane-receiving slot.

As shown in FIG. 1, the improved separator 11 is used as a replacement for the conventional screen separator employed in an exhaust circuit of a typical EMD Diesel locomotive. Unit 11 is interposed between the last section 12 of the exhaust manifold and the expansion coupling 13 which leads to the inlet 14 of the turbocharger. The separator includes a tubular casing having a cylindrical wall 15 of relatively large diameter at its inlet end, a short cylindrical wall 16 of smaller diameter adjacent its outlet end, and an intermediate conical wall 17. The casing also includes a pair of external flanges 18 and 19 which are welded, respectively, to the cylindrical walls 15 and 16, and through which the unit is bolted to the flanges of the adjacent portions of the exhaust piping.

The casing of separator 11 contains a coaxial cylindrical screen 21 which is welded at one end to flange 19 and extends to the inlet end of the casing in cantilever fashion (i.e., it is supported solely by the welded connection to flange 19). The free end of screen 21 is covered by a conical deflector 22 which extends axially beyond flange 18, and which directs the incoming hot gases radially outward to an annular chamber 23 bounded by the casing and the screen. A set of eight turning vanes 24, mounted on the free, unperforated end of screen 21, imparts swirling motion to gases entering annular chamber 23 in order to effect centrifugal separation of entrained debris. This debris is forced to the outer periphery of that chamber and passes into a collection duct 25 which communicates tangentially with chamber 23 via an opening 26 formed partly in cylindrical casing wall 15 and partly in conical casing wall 17 just below the horizontal centerline of the unit. Duct 25 extends around the separator casing in the direction of swirl and directs separated debris to a collection zone 27 located below the casing. Collected debris is removed from zone 27 through an access port 28, which normally is closed by a removable cover 29. Annular chamber 23 also is provided with an auxiliary debris-withdrawal opening 31 which extends through the casing at the junction between walls 15 and 17 and connects the bottom of the chamber directly with collection zone 27. Inclusion of this opening 31 insures that any debris which settles to the bottom of chamber 23 will drop into the collection duct, rather than accumulate in the chamber.

Referring to FIGS. 6 and 8–10, screen 21 has a region 32 adjacent its free end which either is unperforated or has an interrupted perforation pattern and which contains eight, equiangularly spaced, vane-receiving slots 33. These slots open through the edge of screen 21, and each is provided with stress relief holes 34 at its inner end and is inclined at an angle at about 45° with respect to the axis of the separator. Each of the vanes 24 is provided with a hub 35 containing a pair of grooves 36 formed in its opposite sides which define a narrow central web 37. The grooves and web are so dimensioned that the vanes slide freely in screen slots 33, yet are retained securely against dislodgment in the radial direction by the abutting marginal portions of the grooves and the slots. Axial dislodgment of the vanes is prevented by the closed inner ends of slots 33 and by deflector 22 which is welded to the free edge of screen 21. The vanes 24 span almost the entire radial width of chamber 23, so that substantially the whole gas stream entering that chamber is swirled. However, it is important that the tips of the vanes be spaced radially inward from casing wall 15 a distance sufficient to preclude imposition of radial restraint on the free end of screen 21 under all operating conditions. This arrangement, and the absence of rigid restraints in the connections between the vane hubs and the screen, reduces the risk that harmful internal stresses will develop as a result of differential thermal expansions and contractions during service.

Figure 11:
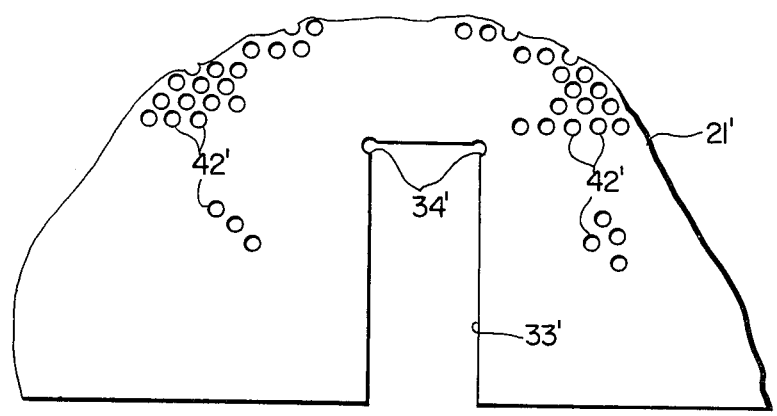
FIG. 11 is a development view, similar to FIG. 6, showing the preferred type of vane-receiving slot.
Figure 12:
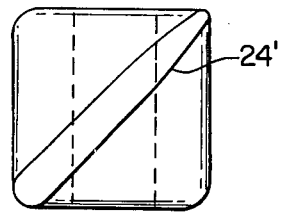
FIGS. 12 and 13 are plan and face views, respectively, of the preferred vane used with the slot arrangement depicted in FIG. 11.
Figure 13:
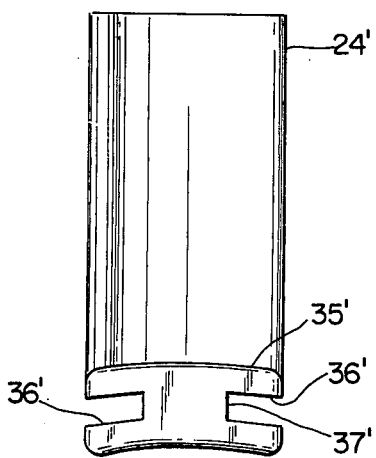

A better vane-mounting scheme is depicted in FIGS. 11–13 wherein corresponding parts are designated by the same reference numerals with primes added for clarity. In this alternative, the vane-receiving slots 33' in screen 21' extend in the direction of the separator axis, and the vanes 24' are inclined at an angle of 45° with respect to the grooves 36' formed in their hubs 35'. This mounting scheme is preferred over the one described earlier because it provides more stable mechanical engagement between the screen and the vanes, and also because it is easier to construct.

The flow cross section at separator outlet 38 is the same as that of expansion coupling 13, so the hot gases are delivered to the turbocharger at the same velocity as in existing installations. This velocity is higher than the velocity in manifold section 12, and the separator is designed to effect this increase in a relatively gradual manner. One portion of the increase occurs in the region of the inlet, where conical deflector 22 serves to progressively reduce the flow area within manifold section 12 as it guides the gases to the annular inlet 39 of chamber 23. The velocity increase afforded here is desirable, because it results in the vigorous swirling action needed for effective centrifugal separation of entrained debris. As the gases move axially through chamber 23, conical housing wall 17 gradually narrows the flow path and directs the gases into and through screen 21. A further increase in velocity is effected by the screen, the perforations of which have a combined flow area intermediate the flow areas of inlet 39 and outlet 38. In a representative case, the perforated region of the screen is 40% open, the perforations have a diameter of $\frac{1}{4}$ inch, are arranged in staggered rows with a center-to-center spacing of $\frac{3}{8}$ inch, and the screen has a flow area about one-half that of inlet 39 and about 10% greater than the area of outlet 38.

Figure 7:
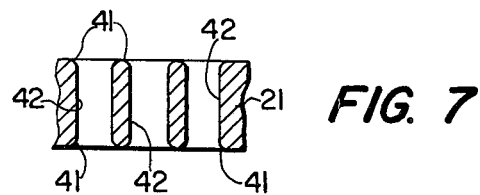
FIG. 7 is an enlarged sectional view through several of the screen perforations.
Figure 8:
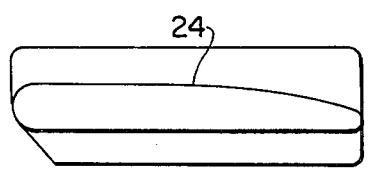
FIGS. 8, 9 and 10 are enlarged plan, side and end views, respectively, of one type of turning vane.
Figure 9:
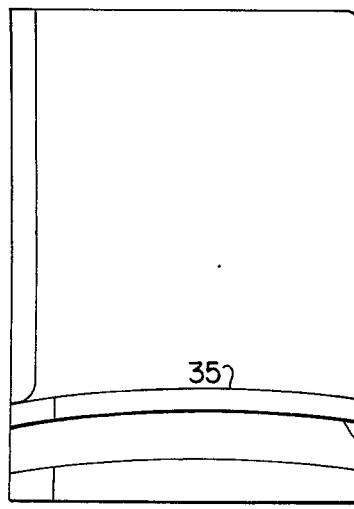
Figure 10:
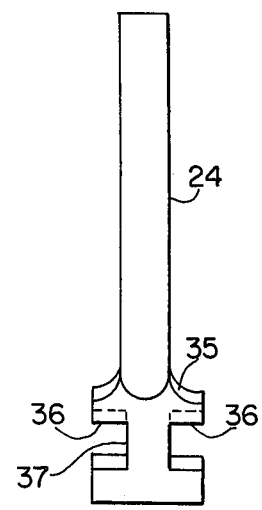
Figure 14:
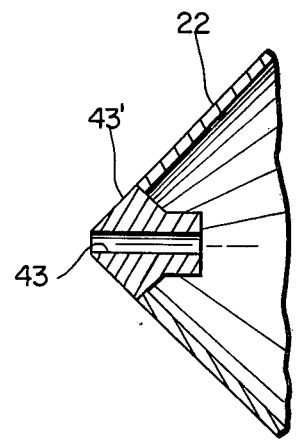
FIG. 14 is an enlarged axial sectional view of the apex of the deflector showing the preferred manner of providing the axial bleed passage.

As indicated in FIG. 7, the marginal edges 41 of each of the perforations 42 in the screen preferably are rounded (for example, on a radius of about 1/32 inch). This measure tends to smooth the flow of gases through screen 21 by reducing turbulence. Turbulence within screen 21 is further reduced by inclusion of an axial bleed passage 43 wich extends through deflector 22 and connects the interior region of the screen with the upstream side of the separator. Deflector 22 is fabricated from sheet stock, so it is preferred that bleed passage 43 be formed in a machined insert 43' (see FIG. 14) which is welded in place at the apex of the deflector. Passage 43 conveys a small stream of gas directly to the interior of the screen, and thereby precludes creation of negative pressures, with accompanying turbulence, in that region. The bleed passage, of course, should not pass harmful debris, so it must be relatively small (e.g. $\frac{1}{4}$ inch diameter). In some instances, it may be necessary to use several of these small bleed passages in order to achieve the desired level of turbulence suppression. Any additional bleed passages would, of course, be arranged in a circular array about the central bleed passage 43.

The components of separator 11 are made from AISI 1045 steel, or an equivalent alloy, and it is recommended that AWS E-8016-B2 welding rod or EMS-882 flux core wire be used to create the welded joints. After fabrication, the unit should be subjected to a stressrelieving treatment. Typically, this involves holding the unit for one hour in a furnace at 1200° F, cooling it to 900° F in the furnace, and then removing it from the furnace and allowing it to cool to ambient temperature in the atmosphere. After this treatment, all welding slag should be removed.

In operation, the hot gases leaving manifold section 12 are deflected radially outward and accelerated by deflector 22 and are swirled by vanes 24 as they pass into annular chamber 23. The gases move along a generally helical path through chamber 23, and then are directed radially inward through the perforations in screen 21 by the conical casing wall 17. Finally, the gases flow axially through the interior of the screen and outlet 38 to coupling 13, thence to the inlet 14 of the turbocharger. The outlet stream will be free of all debris of a size larger than the perforations in screen 21. Removal of such material may be accomplished in several ways. For example, some debris, particularly relatively large pieces of broken engine parts, may strike deflector 22 or the vanes 24 and be deflected directly through opening 26 into collection duct 25. Other debris may ricochet within chamber 23 and then either pass into duct 25 through opening 26 or settle to the bottom of the chamber and drop into that duct through opening 31. However, it is believed that the major part of entrained debris, and certainly smaller metal pieces and carbon particles, will be separated from the gas by centrifugal action and be withdrawn from the outer peripheral region of chamber 23 via openings 26 and 31. Material which enters duct 25 through opening 26 descends by gravity to collection zone 27, where it accumulates along with any debris which falls through opening 31. The accumulated material is periodically removed through access port 28.

I claim:

1. A separator for removing entrained debris from hot gases flowing from the exhaust manifold of an engine to the inlet of an associated turbocharger, the separator comprising
   a. a tubular casing having inlet and outlet openings at its opposite ends;
   b. a cylindrical, perforated screen attached to the casing adjacent the outlet end thereof and extending axially through the casing in cantilever fashion,
   c. the screen and the casing bounding an intervening annular chamber which communicates directly with the casing inlet, and communicates indirectly with the casing outlet through the perforations and the interior of the screen;
   d. a circumferential series of slots formed in the screen at its free end;
   e. a set of turning vanes carried by the screen and arranged to impart swirling motion to gases entering the annular chamber,
   f. the vanes having hubs which form a sliding fit with said slots and are held against dislodgment in the radial direction by the slot margins, and tips which are spaced radially inward from a surrounding region of the casing;
   g. a deflector member attached to and covering the free end of the screen,
   h. the deflector member closing said slots so as to preclude axial dislodgment of the vanes and being shaped to direct approaching hot gases radially outward to the annular chamber; and
   i. a collection duct which communicates with an outer peripheral region of the annular chamber and serves to withdraw from that chamber debris which separates from the hot gases.

2. A separator as defined in claim 1 which includes at least one bleed passage extending through the deflector member for leading a gas stream into the interior of the screen, whereby turbulence within the screen is reduced.

3. A separator as defined in claim 2 in which the marginal edges of the perforations in the screen are rounded.

4. A separator as defined in claim 1 in which the flow areas afforded by both the combined screen perforations and the inlet openings are greater than the flow area of the outlet opening.

5. A separator as defined in claim 4 in which the flow area of the combined screen perforations is less than the flow area of the inlet opening.

6. A separator as defined in claim 1 in which the deflector member has a conical shape.

7. A separator as defined in claim 1 in which the casing comprises a cylindrical inlet portion and an adjoining, converging conical portion, both of which bound the annular chamber, whereby gases are directed radially inward through the screen.

8. A separator as defined in claim 1 in which
   a. the casing comprises a cylindrical inlet portion, a cylindrical outlet portion of smaller diameter than said inlet portion, an intermediate conical portion, and a pair of external bolting flanges located at the ends of the cylindrical portions;
   b. the screen is attached at one end to the flange at the outlet end of the casing and extends axially to the inlet opening; and
   c. the deflector member is of conical shape and projects axially beyond the inlet end of the casing.

9. A separator as defined in claim 8 in which
   a. the longitudinal axis of the casing is generally horizontally disposed;
   b. the collection duct communicates tangentially with the annular chamber through an opening formed partly in said cylindrical inlet portion and partly in said intermediate conical portion of the casing and extends circumferentially around the casing in the direction of gas swirl to a collection zone located beneath the casing; and
   c. the duct is provided with a clean-out port in the region of said collection zone which is closed by a removable cover.

10. A separator as defined in claim 9 which includes an auxiliary opening which is formed partly in said cylindrical inlet portion and partly in said intermediate portion, is located at the bottom of said annular chamber, and opens into the collection zone of the duct, whereby debris which settles to the bottom of the annular chamber may drop directly into said collection zone.

11. A separator as defined in claim 1 in which
   a. the slots in the screen extend in the direction of the separator axis;
   b. the vane hubs have side faces containing grooves which fit the slot margins; and
   c. the vanes are inclined with respect to said grooves.

* * * * *